(12) United States Patent
Kim et al.

(10) Patent No.: US 11,512,186 B2
(45) Date of Patent: Nov. 29, 2022

(54) RUBBER COMPOSITION FOR TIRE TREAD AND TIRE MANUFACTURED BY USING SAME

(71) Applicant: HANKOOK TIRE & TECHNOLOGY CO., LTD., Seongnam-si (KR)

(72) Inventors: Kihyun Kim, Daejeon (KR); Kiwon Lim, Chungcheongbuk-do (KR)

(73) Assignee: HANKOOK TIRE & TECHNOLOGY CO., LTD.

(*) Notice: Subject to any disclaimer, the term of this patent is extended or adjusted under 35 U.S.C. 154(b) by 197 days.

(21) Appl. No.: 16/984,128

(22) Filed: Aug. 3, 2020

(65) Prior Publication Data

US 2021/0032444 A1 Feb. 4, 2021

(51) Int. Cl.

| | |
|---|---|
| C08L 9/06 | (2006.01) |
| B60C 1/00 | (2006.01) |
| C08K 3/04 | (2006.01) |
| C08K 3/36 | (2006.01) |
| C08K 11/00 | (2006.01) |
| C08L 47/00 | (2006.01) |

(52) U.S. Cl.
CPC .............. *C08L 9/06* (2013.01); *B60C 1/0016* (2013.01); *C08K 3/04* (2013.01); *C08K 3/36* (2013.01); *C08K 11/005* (2013.01); *C08L 47/00* (2013.01)

(58) Field of Classification Search
CPC .......... C08L 9/06; C08L 47/00; B60C 1/0016; C08K 3/04; C08K 3/36
USPC ....................................... 523/152
See application file for complete search history.

(56) References Cited

U.S. PATENT DOCUMENTS

| | | | |
|---|---|---|---|
| 2006/0167160 A1* | 7/2006 | Nakagawa | C08L 9/06 524/442 |
| 2016/0215127 A1* | 7/2016 | Sawada | B60C 1/0025 |
| 2016/0222197 A1* | 8/2016 | Peters | C08L 9/00 |
| 2017/0114212 A1* | 4/2017 | Pompei | C08L 9/06 |
| 2019/0062539 A1* | 2/2019 | Adachi | C08K 3/04 |

FOREIGN PATENT DOCUMENTS

| | | |
|---|---|---|
| CN | 109206691 A | 1/2019 |
| EP | 3326838 A1 | 5/2018 |
| EP | 3424750 A1 | 1/2019 |
| JP | 2000129037 A | 5/2000 |
| JP | 2003253051 A | 9/2003 |
| JP | 2008184517 A | 8/2008 |
| JP | 2015196814 A | 11/2015 |
| JP | 2018083884 A | 5/2018 |
| JP | 2018177908 A | 11/2018 |
| JP | 2019014796 A | 1/2019 |
| WO | WO 2017/150645 | * 3/2017 |

* cited by examiner

*Primary Examiner* — Doris L Lee
(74) *Attorney, Agent, or Firm* — Renaissance IP Law Group LLP

(57) ABSTRACT

The present disclosure relates to a rubber composition for tire tread and a tire manufactured by using the rubber composition for the tire tread, and more specifically to, a rubber composition for tire tread, the rubber composition comprising: 100 parts by weight of a raw rubber; 50 to 200 parts by weight of a reinforcing filler; 5 to 100 parts by weight of a hydrocarbon-based resin; and 5 to 50 parts by weight of a hydrogenated styrene-butadiene rubber, and a tire manufactured by using the rubber composition for the tire tread.

7 Claims, No Drawings

RUBBER COMPOSITION FOR TIRE TREAD AND TIRE MANUFACTURED BY USING SAME

CROSS-REFERENCE TO RELATED APPLICATION

This application claims priority to Korean Patent Application No. 10-2019-0093784, filed on Aug. 1, 2019, the disclosure of which is incorporated by reference herein in its entirety.

BACKGROUND

Field

The present disclosure relates to a rubber composition for tire tread and a tire manufactured by using the rubber composition for the tire tread, and more specifically to, a rubber composition for tire tread, which can be used as summer and four-season tires by enabling abrasion resistance performance to be greatly improved while maintaining braking performance on dry and wet road surfaces, and a tire manufactured by using the rubber composition for the tire tread.

Related Art

A lot of effort is being made in an automobile industry to improve such environmental problems as environmental problems become a big issue around the world due to global warming, fine dust and others in addition to a high oil price problem caused by petroleum depletion. According as a labeling system has been reinforced worldwide starting from Europe since 2012, the marked performances and ratings are provided to consumers after marking braking performance on a wet road surface, fuel efficiency performance, and ratings for noise, and an energy consumption efficiency grading system is being carried out also within the country in line with this global trend.

As a tire industry focuses on product development with emphasis on labelling performance, a trade-off tendency in which the other performance is at a disadvantage to improve one performance has been shown, and abrasion resistance performance that may affect the buying cycle of consumers, snow performance that affects wintertime ice and snow braking and handing performance, and figure resistance performance that determines long-term stability of a tire correspond to labelling performance.

The tire industry is divided into summer tires and winter tires in the case of the European market, and four-season tires are mainly a major selling market in North America and at home. Recently, the tire industry has gradually been grown into the four-season tires with the development of the North American market in an environment in which the tire industry has been divided into the summer tires and winter tires. Since the four-season tires are used without replacing tires even in wintertime as well as summer, braking performance and abrasion resistance performance on a wet road surface, and braking performance on an ice and snow road surface are all required in the four-season tires. However, such braking performance and abrasion resistance performance on the wet road surface, and braking performance on the ice and snow road surface conflicting performances. Therefore, the braking performance on the ice and snow road surface is lowered although mechanical properties of the rubber composition are improved when glass transition temperature ($T_g$) of a rubber composition is increased, or when the content of a reinforcing agent is increased so as to improve the braking performance on the wet road surface.

Although the New European Driving Cycle (NEDC) has been used from 1980 in order to measure fuel economy, the fuel economy has newly been measured based on the worldwide harmonized light vehicles test procedure (WLTP) from 2017 due to recent emission control incidents of some global automotive manufacturers.

In order to decrease emissions generated from a vehicle, required situations are that weight lightening of all components constituting the vehicle as well as the vehicle is essential, and tires also desperately need weight lightening techniques. Particularly, since the tires are an issue directly related to safety of passengers as well as performances of the vehicle, manufacturing of the tires should be made by considering various performances.

Particularly, since braking performance is an issue directly related to safety of an automobile, and abrasion resistance performance is an issue directly related to consumers' economy, it is actual state that research and development for solving the braking performance and abrasion resistance performance as major concerns of tire manufacturers has actively been promoted.

For the purpose of structural weight lightening for solving such problems, it is required to apply a weight lightening material without deteriorating performance of tires, and it is essential to develop techniques of decreasing weight of the tires by reducing thickness of tread through improvement in abrasion resistance performance of a tread composition, i.e., a portion that is brought into contact with a rod surface.

Further, a different technical approach is needed in addition to a method of increasing the content of butadiene rubber since braking performance on a dry road surface or a wet road surface is deteriorated although tires have conventionally been manufactured by increasing the content of butadiene rubber, thereby designing the rubber composition such that grass transition temperature of a rubber composition is low so as to solve the above-mentioned problems. However, as required performances of automobile manufacturers and consumers have been more improved, braking performance and fuel efficiency performance should be maintained, and abrasion resistance performance should also be improved at the same time. In order to increase abrasion resistance performance, it is generally necessary to appropriately use a styrene-butadiene rubber and a butadiene rubber that have appropriate reinforcing agent contents and low glass transition temperatures. However, there is a problem in processability when using the styrene-butadiene rubber having low glass transition temperatures.

SUMMARY

The purpose of the present disclosure is to provide a rubber composition for tire tread, which can be applied to four-season and summer tires by maximizing abrasion resistance performance without deteriorating performance on a dry or wet road surface, and a tire manufactured by using the rubber composition for the tire tread.

To achieve the purpose, a rubber composition for tire tread according to an aspect of the present disclosure comprises: 100 parts by weight of a raw rubber; 50 to 200 parts by weight of a reinforcing filler; 5 to 100 parts by weight of a hydrocarbon-based resin; and 5 to 50 parts by weight of a hydrogenated styrene-butadiene rubber.

At this time, the raw rubber may be a solution polymerized styrene-butadiene rubber having 10 to 30 wt % of a styrene content, 10 to 40 wt % of a vinyl content within butadiene, 500,000 to 900,000 g/mol of a weight average molecular weight ($M_w$), and −70 to −55° C. of a glass transition temperature.

Further, the reinforcing filler may be carbon black, silica, or a mixture thereof.

Further, the hydrocarbon-based resin may be a hydrocarbon-based resin having 2,000 g/mol or less of a weight average molecular weight ($M_w$) and 80° C. or more of a glass transition temperature.

Meanwhile, the hydrogenated styrene-butadiene rubber may be a hydrogenated styrene-butadiene rubber in which the number of double bonds within a main chain of the styrene-butadiene rubber through hydrogenation with respect to a styrene-butadiene rubber is not more than 2% of the total number of bonds within the main chain, of which a weight average molecular weight ($M_w$) is 100,000 to 500,000 g/mol, and which has not more than 1 wt % of a vinyl content therewithin.

At this time, the hydrogenated styrene-butadiene rubber may be a hydrogenated styrene-butadiene rubber which is manufactured through hydrogenation with respect to a styrene-butadiene rubber having 30 to 35 wt % of a styrene content and 25 to 40 wt % of a vinyl content.

Further, the hydrogenated styrene-butadiene rubber may be a hydrogenated styrene-butadiene rubber having −40 to −20° C. of a glass transition temperature.

A tire according to the other aspect of the present disclosure is manufactured by using the aforementioned rubber composition for tire tread according to the present disclosure.

DESCRIPTION OF EXEMPLARY EMBODIMENTS

Hereinafter, embodiments of the present disclosure will be described in detail such that person with ordinary skill in the art to which the present disclosure pertains can easily carry out the embodiments of the present disclosure. However, the present disclosure may be embodied in various different forms, and the present disclosure is not limited to the embodiments described herein.

A rubber composition for tire tread according to an embodiment of the present disclosure comprises: 100 parts by weight of a raw rubber; 50 to 200 parts by weight of a reinforcing filler; 5 to 100 parts by weight of a hydrocarbon-based resin; and 5 to 50 parts by weight of a hydrogenated styrene-butadiene rubber.

As a rubber composition for tire tread according to the present disclosure comprises a hydrocarbon-based resin and a hydrogenated styrene-butadiene rubber to improve compatibility of a raw rubber, particularly a raw rubber having a very low glass transition temperature, a rubber composition for tire tread according to the present disclosure can maximize abrasion resistance performance without deteriorating performance on a dry or wet road surface, and a tire manufactured by using such a rubber composition is suitable for four-season and summer tires.

At this time, the raw rubber may be a solution polymerized styrene-butadiene rubber having a styrene content of 10 to 30 wt %, preferably 10 to 20 wt %, a vinyl content within butadiene of 10 to 40 wt %, preferably 20 to 30 wt %, a weight average molecular weight ($M_w$) of 500,000 to 900,000 g/mol, and a glass transition temperature of −70 to −55° C., wherein the solution polymerized styrene-butadiene rubber may be manufactured by a batch process.

The solution polymerized styrene-butadiene rubber manufactured by the batch process is disadvantageous in processability due to a very low glass transition temperature ($T_g$), a low styrene content, and a low Mooney viscosity. However, since the solution polymerized styrene-butadiene rubber has a low hysteresis loss due to its low styrene content and low glass transition temperature, the solution polymerized styrene-butadiene rubber is advantageous in the aspect of rolling resistance and is excellent in abrasion resistance performance. On the other hand, the solution polymerized styrene-butadiene rubber may be disadvantageous in braking performance on a dry or wet road surface.

Moreover, the solution polymerized styrene-butadiene rubber may be a solution polymerized styrene-butadiene rubber which is denaturalized into a rubber chain by using silicate such as tetraethyl orthosilicate.

Meanwhile, a reinforcing filler according to the present disclosure may include carbon black, silica or a mixture thereof, and may be used in an amount of 50 to 200 parts by weight, preferably 100 to 130 parts by weight. At this time, typical examples of the carbon black according to the present disclosure may include N110, N121, N134, N220, N231, N234, N242, N293, N299, S315, N326, N330, N332, N339, N343, N347, N351, N358, N375, N539, N550, N582, N630, N642, N650, N683, N754, N762, N765, N774, N787, N907, N908, N990, N991, and others.

In addition, the silica according to the present disclosure, when using precipitated silica having a BET surface area of 160 to 180 $m^2$/g and a DBP (paraffin oil) oil absorption amount of 180 to 210 cc/100 g, is advantageous in improvement of abrasion resistance performance and can further improve braking performance on a wet road surface since the silica is more easily dispersed.

A rubber composition for tire tread according to the present disclosure comprises 5 to 100 parts by weight, preferably 20 to 70 parts by weight of a hydrocarbon-based resin. A hydrocarbon-based resin instead of a conventional process oil is used as a softening agent in the present disclosure, wherein the hydrocarbon-based resin plays a role of complementing unfavorable processability of the raw rubber. Furthermore, the hydrocarbon-based resin not only greatly improves processability by providing an effect of increasing glass transition temperature ($T_g$), but also greatly improves braking performance of a rubber composition for tire tread by using the hydrocarbon-based resin along with the raw rubber and the reinforcing filler including silica, and the hydrocarbon-based resin may be suitably used as the rubber composition for tire tread by greatly improving abrasion resistance performance also.

A hydrocarbon-based resin that may be used in the present disclosure, as a hydrocarbon resin such as cyclopentadiene, dichloropentadiene, methylcyclopentadiene or the like, may have about 2,000 g/mol or less of a weight average molecular weight and 80° C. or more of a glass transition temperature.

However, since there are some difficulties in the process when applying the hydrocarbon-based resin in an excessive amount, a hydrogenated styrene-butadiene rubber is applied in the present disclosure as a way to solve this problem.

In a hydrogenated styrene-butadiene rubber according to the present disclosure, the number of double bonds which are within a main chain of the styrene-butadiene rubber through hydrogenation with respect to a styrene-butadiene rubber is very few compared to a general styrene-butadiene rubber, and may be 2% or less, preferably 1.5% or less, and more preferably 0.3 to 0.7% of the number of total bonds which are within the main chain.

When using the hydrogenated styrene-butadiene rubber by adding the hydrogenated styrene-butadiene rubber to the rubber composition for tire tread, the hydrogenated styrene-butadiene rubber will be existed in such a form that only a small portion of the hydrogenated styrene-butadiene rubber is participated or not participated in crosslinking with sulfur, and is dispersed in the rubber composition for tire tread. Accordingly, an effect of improving rolling resistance is generated due to an increase in the content of rubber in the total rubber composition for tire tread.

As the content of double bonds which are existed in the main chain through hydrogenation is reduced in the hydrogenated styrene-butadiene rubber, the hydrogenated styrene-butadiene rubber has a tendency that Mooney viscosity is increased relatively very high by an existing polyethylene portion. Since processability may be disadvantageous in this case, there is an effect of lowering Mooney viscosity when performing a hydrogenation process by increasing a vinyl content, and it is desirable to adjust glass transition temperature of the hydrogenated styrene-butadiene rubber by controlling styrene and vinyl contents.

Meanwhile, the hydrogenated styrene-butadiene rubber has a low hydrogenation ratio such that the hydrogenated styrene-butadiene rubber may be more participated in a crosslinking reaction when there is a large number of double bonds. Therefore, in this case, it is difficult to determine the hydrogenated styrene-butadiene rubber by an additive, and the hydrogenated styrene-butadiene rubber affects a crosslinking system such that the hydrogenated styrene-butadiene rubber may have adverse effects on mechanical properties and viscoelastic property.

Moreover, the hydrogenated styrene-butadiene rubber may have a weight average molecular weight (Mw) of 100,000 to 500,000 g/mol, preferably 200,000 to 400,000 g/mol, and may secure abrasion resistance performance and may have an excellent processability effect by satisfying such numerical value ranges.

Further, the hydrogenated styrene-butadiene rubber may have a vinyl content of 1 wt % or less, preferably 0.1 to 0.7 wt % differently from structural characteristics of a general styrene-butadiene rubber. The hydrogenated styrene-butadiene rubber may improve abrasion resistance performance of a tire by reducing double bonds of a vinyl group within styrene-butadiene through hydrogenation.

In addition, the hydrogenated styrene-butadiene rubber may be manufactured through hydrogenation with respect to a styrene-butadiene rubber having 30 to 35 wt % of a styrene content and 25 to 40 wt % of a vinyl content. The hydrogenation with respect to the styrene-butadiene rubber may be generally carried out according to prior art.

Furthermore, the hydrogenated styrene-butadiene rubber has a glass transition temperature of −40 to −20° C., preferably −40 to −30° C. The hydrogenated styrene-butadiene rubber may contribute to improvement of braking performance on a dry or wet road surface by having a high glass transition temperature compared to raw rubber having a glass transition temperature of −70 to −55° C.

Meanwhile, natural oils may be used in a rubber composition for tire tread according to the present disclosure to solve a trade-off problem of general tires, and a vegetable oil having an unsaturated fatty acid among the natural oils may be applied. A rubber composition for tire tread according to the present disclosure may improve abrasion resistance performance and braking performance on an ice and snow road surface by further comprising the vegetable oil.

Further, the vegetable oil that may be used in the present disclosure may be any one selected from the group consisting of sunflower oil, soybean oil, canola oil, grape seed oil, and mixtures thereof, and may comprise 60 to 90 wt % of an unsaturated fatty acid with respect to the total weight of the vegetable oil.

The vegetable oil may have a ratio of oleic acid to linoleic acid of 1:0.5 to 1:5.0 in the unsaturated fatty acid. A trade-off may be generated in aspects of braking performance on a wet road surface and rotational resistance performance although braking performance on an ice and snow road surface and abrasion resistance performance are excellent when less than 0.5 part by weight of the oleic acid is included with respect to 1 part by weight of the linolenic acid. On the contrary, effects of the braking performance on the ice and snow road surface and the abrasion resistance performance may be insignificant although a trade-off phenomenon is insignificant when more than 1.5 part by weight of the oleic acid is included with respect to 1 part by weight of the linolenic acid.

Further, the natural oils are preferably used in an amount of 10 to 30 parts by weight with respect to 100 parts by weight of the raw rubber. There may be a problem that effects of the abrasion resistance performance and the braking performance on the ice and snow road surface are insignificant when the natural oils are included in an amount of less than 10 parts by weight, and there may a problem that the rotation resistance and the braking performance on the wet road surface are excessively lowered when the natural oils are included in an amount of more than 30 parts by weight.

Silica in an ordinary rubber composition may be chemically bonded with the rubber while the silica in the ordinary rubber composition is being modified into an organophilic silica within rubber through a reaction with a silane coupling agent. As movement of silica within the rubber is limited when surface chemical properties of silica are transformed as described above, hysteresis is lowered, and heating and rotational resistance of a rubber composition are reduced as a result. However, if dispersion of silica is not sufficiently made within the rubber, heating and rotational resistance of the rubber composition are reduced insignificantly, and abrasion resistance of the rubber composition may be rather deteriorated.

Therefore, a rubber composition for tire tread according to the present disclosure may comprise a silane coupling agent.

The silane coupling agent can be used without special limitations if the coupling agent is used as a coupling agent with respect to silica in an ordinary rubber composition. Specifically, the silane coupling agent may be selected from the group consisting of a sulfide-based silane compound, a mercapto-based silane compound, a vinyl-based silane compound, an amino-based silane compound, a glycidoxy-based silane compound, a nitro-based silane compound, a chloro-based silane compound, a methacrylic silane compound, and mixtures thereof.

The sulfide-based silane compound may be any one selected from the group consisting of bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)

disulfide, bis(4-trimethoxysilylbutyl)disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilylpropylbenzothiazolyltetrasulfide, 3-triethoxysilylpropylbenzothiazoltetrasulfide, 3-trimethoxysilylpropylmethacrylatemonosulfide, and mixtures thereof.

The mercapto-based silane compound may be any one selected from the group consisting of 3-mercaptopropyltrimethoxysilane, 3-mercaptopropyltriethoxysilane, 2-mercaptoethyltrimethoxysilane, 2-mercaptoethyltriethoxysilane, and combinations thereof. The vinyl-based silane compound may be any one selected from the group consisting of ethoxysilane, vinyltrimethoxysilane, and a combination thereof. The amino-based silane compound may be any one selected from the group consisting of 3-aminopropyltriethoxysilane, 3-aminopropyltrimethoxysilane, 3-(2-aminoethyl)aminopropyltriethoxysilane, 3-(2-aminoethyl)aminopropyltrimethoxysilane, and combinations thereof.

The glycidoxy-based silane compound may be any one selected from the group consisting of γ-glycidoxypropyltriethoxysilane, γ-glycidoxypropyltrimethoxysilane, γ-glycidoxypropylmethyldiethoxysilane, γ-glycidoxypropylmethyldimethoxysilane, and combinations thereof. The nitro-based silane compound may be any one selected from the group consisting of 3-nitropropyltrimethoxysilane, 3-nitropropyltriethoxysilane, and a combination thereof. The chloro-based silane compound may be any one selected from the group consisting of 3-chloropropyltrimethoxysilane, 3-chloropropyltriethoxysilane, 2-chloroethyltrimethoxysilane, 2-chloroethyltriethoxysilane, and combinations thereof.

The methacrylic silane compound may be any one selected from the group consisting of γ-methacryloxypropyltrimethoxysilane, γ-methacryloxypropylmethyldimethoxysilane, γ-methacryloxypropyldimethylmethoxysilane, and combinations thereof.

The sulfide-based silane compounds may be desirable among the above-mentioned silane coupling agents when considering coupling effects on silica, and bis-(3-(triethoxysilyl)-propyl)-disulfide (TESPD) or bis-(3-(triethoxysilyl)-propyl)-tetrasulfide (TESPT) among the sulfide-based silane compounds may be more desirable.

The above-mentioned silane coupling agents may be included in an amount of 5 to 10 parts by weight based on 100 parts by weight of a raw rubber. Since effects of transforming surface chemical properties with respect to silica are insignificant when the silane coupling agents are included in an amount of less than 5 parts by weight, dispersibility of silica may be deteriorated, and reinforcement properties and durability of a tire may be deteriorated as a result. Further, when the silane coupling agents are included in an amount of more than 10 parts by weight, abrasion resistance performance and fuel efficiency performance of the tire may be rather deteriorated since the silane coupling agents are used in an excessive amount. It may be more preferable that the silane coupling agents are included in an amount of 5 to 7 parts by weight based on 100 parts by weight of the raw rubber when considering that improvement effects are remarkable.

Furthermore, a rubber composition for tire tread according to the present disclosure may further comprise a processing aid for increasing dispersibility of a reinforcing filler.

The silane coupling agents usually play a role of dissociating strong cohesion between silica and silica when using silica alone by playing a bridging role of linking silanol group of silica surface and raw rubber of composition. However, if a content of silica in rubber component or specific surface area of silica is increased, decrease in dispersibility may occur despite the addition of the silane coupling agents.

In this context, dispersibility of a high specific surface area silica is improved, and scorch stability, durability, and abrasion resistance may be improved by using an aliphatic compound, specifically a fatty acid ester-based compound, and more specifically a metal salt modified by a fatty acid ester-based compound having 13 to 22 carbon atoms as a processing aid within a rubber composition for tire tread according to the present disclosure.

In the processing aid as an amphipathic material including a hydrophilic group of metal ions and a hydrophobic group of a fatty acid at the same time, the metal ions are reacted with a silanol group in the surface of silica such that the metal ions induce de-agglomeration during a mixing process by reducing surface energy between molecules with respect to silica agglomerates which are strongly bonded to each other by hydrogen bond or dipole bond, and the processing aid increases flow properties and improves scorch stability, durability and abrasion resistance by lowering viscosity of a rubber composition for tire tread as a result. Further, the hydrocarbon group of the fatty acid plays a role of plasticizer which improves processability by diluting the rubber chains since a hydrocarbon group of the fatty acid has excellent compatibility with rubber chains.

Specifically, a metal salt in the processing aid may be a zinc soap, a sodium soap, a potassium soap, a zinc potassium soap, or the like. However, it is apprehended that the sodium soap and potassium soap shorten scorch stability and curing time by reacting with silica before silica and a coupling agent are reacted since the sodium soap and potassium soap have a strong polarity. Accordingly, the zinc soap may be more desirable as the metal salt.

Further, it may be preferable that the zinc soap comprises 1 to 5 wt % of zinc with respect to the total weight of the zinc soap. A dispersion effect is insufficient when the zinc soap comprises less than 1 wt % of zinc, and it is apprehended that performance of a rubber composition is deteriorated as production of a zinc salt is increased when the zinc soap comprises more than 5 wt % of zinc.

Further, the fatty acid ester may be specifically a saturated or unsaturated fatty acid ester having 12 to 22 carbon atoms, and may be more specifically an aliphatic or aromatic carboxylic acid.

Modification of fatty acid ester with respect to the zinc soap may be carried out by performing a condensation reaction of fatty acid ester. At this time, it may be preferable in the aspect of a dispersibility improving effect that the zinc soap within the processing aid and the fatty acid ester have a mixing weight ratio of 20:80 to 40:60.

The processing aid may be prepared by the above-mentioned modification method, or may be commercially available as Struktol® HT 276 or the like.

Further, it may be preferable that the processing aid is included in an amount of 0.5 to 5 parts by weight based on 100 parts by weight of a raw rubber. An effect of dispersing a reinforcing filler is insufficient when the processing aid is included in an amount of less than 0.5 part by weight, and an extent of improving the effect with respect to an used amount of the processing aid is insignificant when the processing aid is included in an amount of more than 5 parts by weight. Further, it may be more preferable that the processing aid is included in an amount of 1 to 3 parts by weight based on 100 parts by weight of the raw rubber when considering that an improving effect is remarkable.

Meanwhile, a rubber composition for tire tread according to the present disclosure may selectively further comprise various additional additives including a vulcanizing agent, a vulcanization accelerator, a vulcanization acceleration aid, an antiaging agent, a softening agent, a retarder, an adhesive, and others. The various additives may include any materials if the materials are commonly used in the art to which the present disclosure pertains, and the contents of the additives are not particularly limited since contents of the additives depend on a mixing ratio used in an ordinary rubber composition for tire tread.

The vulcanizing agent may preferably include a sulfur-based vulcanizing agent. Examples of the sulfur-based vulcanizing agent may include inorganic vulcanizing agents such as a sulfur (S) powder, an insoluble sulfur (S), a precipitated sulfur (S), a colloidal sulfur, and the like. Specifically, examples of the sulfur-based vulcanizing agent may include vulcanizing agents for preparing element sulfur or sulfur, e.g., amine disulfide, polymer sulfur, and the like.

The vulcanizing agent included in an amount of 0.1 to 1.5 part by weight with respect to 100 parts by weight of the raw rubber is desirable in that the vulcanizing agent makes the raw rubber less sensitive to heat and allows the raw rubber to be chemically stable as suitable vulcanizing effects.

The vulcanization accelerator means an accelerator which accelerates vulcanization rate or accelerates delayed action in the initial vulcanization step.

The vulcanization accelerator may be any one selected from the group consisting of a sulfenamide-based vulcanization accelerator, a thiazole-based vulcanization accelerator, a thiuram-based vulcanization accelerator, a thiourea-based vulcanization accelerator, a guanidine-based vulcanization accelerator, a dithiocarbamate-based vulcanization accelerator, an aldehyde amine-based vulcanization accelerator, and an aldehyde ammonia-based vulcanization accelerator, an imidazoline-based vulcanization accelerator, a xanthate-based vulcanization accelerator, and combinations thereof.

Examples of the sulfenamide-based vulcanization accelerator may include any one sulfenamide-based compound selected from the group consisting of N-cyclohexyl-2-benzothiazole sulfenamide (CBS), N-tert-butyl-2-benzothiazolesulfenamide (TBBS), N,N-dicyclohexyl-2-benzothiazolesulfenamide, N-oxydiethylene-2-benzothiazole sulfenamide, N,N-diisopropyl-2-benzothiazole sulfenamide, and combinations thereof.

Examples of the thiazole-based vulcanization accelerator may include any one thiazole-based compound selected from the group consisting of 2-mercaptobenzothiazole (MBT), dibenzothiazyl disulfide (MBTS), a sodium salt of 2-mercaptobenzothiazole, a zinc salt of 2-mercaptobenzothiazole, a copper salt of 2-mercaptobenzothiazole, a cyclohexylamine salt of 2-mercaptobenzothiazole, 2-(2,4-dinitrophenyl) mercaptobenzothiazole, 2-(2,6-diethyl-4-morpholinothio) benzothiazole, and combinations thereof.

Examples of the thiuram-based vulcanization accelerator may include any one thiuram-based compound selected from the group consisting of tetramethylthiuram disulfide (TMTD), tetraethylthiuram disulfide, tetramethylthiuram monosulfide, dipentamethylenethiuram disulfide, dipentamethylenethiuram monosulfide, dipentamethylenethiuram tetrasulfide, dipentamethylenethiuram hexasulfide, tetrabutylthiuram disulfide, pentamethylenethiuram tetrasulfide, and combinations thereof.

Examples of the thiourea-based vulcanization accelerator may include any one thiourea-based compound selected from the group consisting of thiocarbamide, diethyl thiourea, dibutyl thiourea, trimethyl thiourea, diorthotolyl thiourea, and combinations thereof.

Examples of the guanidine-based vulcanization accelerator may include any one guanidine-based compound selected from the group consisting of diphenylguanidine, diorthotolyl guanidine, triphenyl guanidine, orthotolyl biguanide, diphenylguanidine phthalate, and combinations thereof.

Examples of the dithiocarbamate-based vulcanization accelerator may include any one dithiocarbamate-based compound selected from the group consisting of zinc ethylphenyldithiocarbamate, zinc butylphenyldithiocarbamate, sodium dimethyldithiocarbamate, zinc dimethyldithiocarbamate, zinc diethyldithiocarbamate, zinc dibutyldithiocarbamate, zinc diamyldithiocarbamate, zinc dipropyldithiocarbamate, zinc pentamethylenedithiocarbamate, a complex salt of zinc pentamethylenedithiocarbamate and piperidine, zinc hexadecylisopropyldithiocarbamate, zinc octadecylisopropyldithiocarbamate, zinc dibenzyldithiocarbamate, sodium diethyldithiocarbamate, piperidine pentamethylenedithiocarbamate, selenium dimethyldithiocarbamate, tellurium diethyldithiocarbamate, cadmium diamyldithiocarbamate, and combinations thereof.

Examples of the aldehyde amine-based or aldehyde ammonia-based vulcanization accelerator may include an aldehyde amine-based or aldehyde ammonia-based compound selected from the group consisting of an acetaldehyde-aniline reactant, a butyl aldehyde-aniline condensate, hexamethylenetetramine, an acetaldehyde-ammonia reactant, and combinations thereof.

Examples of the imidazoline-based vulcanization accelerator may include an imidazoline-based compound such as 2-mercaptoimidazoline or the like, and examples of the xanthate-based vulcanization accelerator may include a xanthate-based compound such as zinc dibutylxanthate or the like.

The vulcanization accelerator may be included in an amount of 2.0 to 3.0 parts by weight with respect to 100 parts by weight of the raw rubber to maximize enhancement of productivity and enhancement of rubber properties through acceleration of the vulcanization rate.

On the other hand, examples of the vulcanization acceleration aid as a compounding agent which is used in combination with the vulcanization accelerator to perfect an acceleration effect of the vulcanization accelerator, may include any one selected from the group consisting of an inorganic vulcanization acceleration aid, an organic vulcanization acceleration aid, and a combination thereof.

Examples of the inorganic vulcanization acceleration aid may include any one selected from the group consisting of zinc oxide (ZnO), zinc carbonate, magnesium oxide (MgO), lead oxide, potassium hydroxide, and combinations thereof. Examples of the organic vulcanization acceleration aid may include any one selected from the group consisting of stearic acid, zinc stearate, palmitic acid, linoleic acid, oleic acid, lauric acid, dibutyl ammonium oleate, derivatives thereof, and combinations thereof.

Particularly, the zinc oxide can be used along with the stearic acid as the vulcanization acceleration aid. In this case, the zinc oxide is dissolved in the stearic acid to allow the vulcanization acceleration aid together with the vulcanization accelerator to form an effective complex such that a crosslinking reaction of rubber is facilitated by producing advantageous sulfur during a vulcanization reaction.

In order for the zinc oxide and the stearic acid to play a role as an appropriate vulcanization acceleration aid when the zinc oxide is used together with the stearic acid, 1 to 5 parts by weight of the zinc oxide and 0.5 to 3 parts by weight of the stearic acid may be used with respect to 100 parts by weight of the raw rubber. Productivity may be deteriorated as vulcanization rate is slow when contents of the zinc oxide and the stearic acid are less than the above-mentioned ranges, and physical properties may be deteriorated as a scorch phenomenon occurs when the when contents of the zinc oxide and the stearic acid are more than the above-mentioned ranges.

Meanwhile, the antiaging agent is an additive which is used to stop a chain reaction in which a tire is automatically oxidized by oxygen. Examples of the antiaging agent may include any one suitably selected from the group consisting of an amine-based antiaging agent, a phenol-based antiaging agent, a quinolone-based antiaging agent, an imidazole-based antiaging agent, a carbamate metal salt, wax, and combinations thereof.

Examples of the amine-based antiaging agent may include any one selected from the group consisting of N-phenyl-N'-(1,3-dimethyl)-p-phenylenediamine, N-(1,3-dimethylbutyl)-N'-phenyl-p-phenylenediamine, N-phenyl-N'-isopropyl-p-phenylenediamine, N,N'-diphenyl-p-phenylenediamine, N,N'-diaryl-p-phenylenediamine, N-phenyl-N'-cyclohexyl-p-phenylenediamine, N-phenyl-N'-octyl-p-phenylenediamine, and combinations thereof. Examples of the phenol-based antiaging agent may include any one phenol-based antiaging agent selected from the group consisting of 2,2'-methylene-bis(4-methyl-6-tert-butylphenol), 2,2'-isobutylidene-bis(4,6-dimethylphenol), 2,6-di-tert-butyl-p-cresol, and combinations thereof. Examples of the quinolone-based antiaging agent may include 2,2,4-trimethyl-1,2-dihydroquinoline and its derivatives, and specifically may include any one selected from the group consisting of 6-ethoxy-2,2,4-trimethyl-1,2-dihydroquinoline, 6-anilino-2,2,4-trimethyl-1,2-dihydroquinoline, 6-dodecyl-2,2,4-trimethyl-1,2-dihydroquinoline, and combinations thereof. The wax may preferably include a waxy hydrocarbon.

Further, the antiaging agent may be included in an amount of 1 to 5 parts by weight with respect to 100 parts by weight of the raw rubber considering conditions that the antiaging agent should have high solubility in rubber in addition to an antiaging effect, should be low in volatility and inactive to rubber, and should not hinder vulcanization.

On the other hand, examples of the retarder may include any one selected from the group consisting of phthalic anhydride, salicylic acid, sodium acetate, N-(cyclohexylthio)phthalimide, and combinations thereof. The retarder may be included in an amount of 0.1 to 0.5 part by weight with respect to 100 parts by weight of the raw rubber.

And, the adhesive further improves tack performance between rubber and rubber, and improves mixability, dispersibility and processability of other additives including filler, thereby contributing to improvement of physical properties of a rubber composition.

Examples of the adhesive may include a natural resin-based adhesive such as a rosin-based resin or a terpene-based resin, and a synthetic resin-based adhesive such as a petroleum resin, coal tar, an alkyl phenolic resin, or the like.

The rosin-based resin may be any one selected from the group consisting of a rosin resin, a rosin ester resin, a hydrogen-added rosin ester resin, derivatives thereof, and combinations thereof. The terpene-based resin may be any one selected from the group consisting of a terpene resin, a terpene phenol resin, and a combination thereof.

The petroleum resin may be any one selected from the group consisting of an aliphatic resin, an acid-modified aliphatic resin, an alicyclic resin, a hydrogen-added alicyclic resin, an aromatic ($C_9$) resin, a hydrogen-added aromatic resin, a $C_5$-$C_9$ copolymerization resin, a styrene resin, a styrene copolymerization resin, and combinations thereof.

The coal tar may be coumarone-indene resin.

The alkyl phenolic resin may be a p-tert-alkyl phenol formaldehyde resin or a resorcinol formaldehyde resin, and the p-tert-alkyl phenol formaldehyde resin may be any one selected from the group consisting of a p-tert-butylphenol formaldehyde resin, a p-tert-octylphenol formaldehyde resin, and a combination thereof.

The adhesive may be included in an amount of 2 to 4 parts by weight with respect to 100 parts by weight of the raw rubber. Adhesion performance may be disadvantageous if the adhesive is included in an amount of less than 2 parts by weight with respect to 100 parts by weight of the raw rubber, and rubber properties may be deteriorated if the adhesive is included in an amount of more than 4 parts by weight with respect to 100 parts by weight of the raw rubber.

The rubber composition for the tire tread may be prepared through a general continuous preparation process of two steps. That is, the rubber composition for the tire tread may be prepared in a suitable mixer through a first step (referred to as a nonproduction step) of performing a thermomechanical treatment or kneading process at a maximum temperature ranging from 110 to 190° C., preferably at a high temperature of 130 to 180° C., and a second step (referred to as a production step) of performing a mechanical treatment process typically at less than 110° C., e.g., at a low temperature of 40 to 100° C. during a finishing step of mixing a cross-linking system. However, the present disclosure is not limited thereto.

The rubber composition for the tire tread is not limited to a tread part only, but may be included in various rubber components composing a tire such as a tread (a tread cap and a tread base) and others. The rubber components may include a sidewall, a sidewall insert, an apex, a chafer, a wire coat, an inner liner, and others.

Meanwhile, a tire according to the other aspect of the present disclosure is manufactured by using the aforementioned rubber composition for the tire tread.

The tire may be a car tire, a racing tire, an airplane tire, an agricultural machinery tire, an off-the-road tire, a truck tire, a bus tire, or the like. Further, the tire may be a radial tire or a bias tire, and is preferably the radial tire.

Hereinafter, embodiments of the present disclosure will be described in detail such that person with ordinary skill in the art to which the present disclosure pertains can easily carry out the embodiments of the present disclosure. However, the present disclosure can be implemented in various different forms and is not limited to the embodiments described herein.

Preparation Example: Preparing Rubber Compositions for Tire Treads

Rubber compositions for tire treads according to the following Examples and Comparative Examples were prepared by using compositions as shown in the following Table 1. The rubber compositions were prepared by a general method of preparing a rubber composition.

TABLE 1

|  | Comparative Example 1 | Example 1 | Example 2 | Example 3 | Example 4 | Example 5 | Example 6 |
|---|---|---|---|---|---|---|---|
| S-SBR [1] | 100 | 100 | 100 | 100 | 100 | 100 | 100 |
| Silica [2] | 130 | 130 | 130 | 130 | 130 | 130 | 130 |
| Coupling agent [3] | 11 | 11 | 11 | 11 | 11 | 11 | 11 |
| Processing oil [4] | 17 | 17 | 17 | 17 | 17 | 17 | 17 |
| Hydrocarbon-based resin [5] | 60 | 50 | 50 | 40 | 40 | 30 | 30 |
| Hydrogenated S-SBR-1 [6] | — | 10 | — | 20 | — | 30 | — |
| Hydrogenated S-SBR-2 [7] | — | — | 10 | — | 20 | — | 30 |
| Zinc oxide | 3 | 3 | 3 | 3 | 3 | 3 | 3 |
| Stearic acid | 2 | 2 | 2 | 2 | 2 | 2 | 2 |
| Antiaging agent | 1 | 1 | 1 | 1 | 1 | 1 | 1 |
| Vulcanizing agent | 0.7 | 1.15 | 1.15 | 1.15 | 1.15 | 1.15 | 1.15 |
| Accelerator (CBS) | 2.2 | 2.65 | 2.65 | 2.65 | 2.65 | 2.65 | 2.65 |
| Accelerator (ZBEC) | 0.2 | 0.2 | 0.2 | 0.2 | 0.2 | 0.2 | 0.2 |
| Accelerator (DPG) | 2.1 | 2.1 | 2.1 | 2.1 | 2.1 | 2.1 | 2.1 |

(Unit: Parts by weight)

1) S-SBR: Solution polymerized styrene-butadiene rubber (SBR) which includes 15 wt. % of styrene, 25 wt. % of vinyl within butadiene, has a Mooney viscosity of 50 and a glass transition temperature of −63° C., and is manufactured by a batch process
2) Silica: Precipitated silica having a BET surface area of 160 to 180 m$^2$/g and a DBP oil absorption amount of 180 to 210 cc/100 g
3) Coupling agent: a coupling agent having a product name of Si60 as a sulfide-based silane produced by Evonik
4) Natural oil: a natural oil having a ratio of oleic acid to linoleic acid of 0.5 to 5
5) Hydrocarbon-based resin: a hydrocarbon-based resin having a molecular weight of about 2,000 or less and a glass transition temperature of 80° C. or more as a hydrocarbon resin based on a hydrocarbon such as cyclopentadiene, dichloropentadiene, methylcyclopentadiene, or the like
6) Hydrogenated S-SBR-1: a hydrogenerated styrene-butadiene rubber which has a weight average molecular weight of 390,000 g/mol and a vinyl content of 0.4 wt. %, and is synthesized at a glass transition temperature of −32° C.
7) Hydrogenated S-SBR-2: a hydrogenated styrene-butadiene rubber which has a weight average molecular weight of 330,000 g/mol and a vinyl content of 0.5 wt. %, and is synthesized at a glass transition temperature of −37° C.

Experimental Example: Measuring Physical Properties of Rubber Compositions for Tire Treads After measuring Mooney viscosity values, hardness values, 300% modulus values, viscoelasticity values and other values in accordance with related regulations of ASTM and measuring abrasion resistance performance values in accordance with related regulations of DIN with respect to rubber samples manufactured in the above-mentioned Examples and Comparative Example, measurement results are shown in the following Table 2.

TABLE 2

|  | Comparative Example 1 | Example 1 | Example 2 | Example 3 | Example 4 | Example 5 | Example 6 |
|---|---|---|---|---|---|---|---|
| Mooney viscosity | 72 | 77 | 74 | 81 | 77 | 84 | 80 |
| Hardness (Shore A) | 72 | 70 | 70 | 70 | 69 | 69 | 69 |
| 300% modulus (Index) | 100 | 96 | 95 | 95 | 94 | 94 | 94 |
| Toughness (Index) | 100 | 108 | 104 | 112 | 105 | 115 | 108 |
| 0 °C. G" (Index) | 100 | 94 | 93 | 100 | 96 | 101 | 100 |
| 60 °C. tanδ (Index) | 100 | 105 | 105 | 110 | 109 | 114 | 112 |
| LAT-100 abrasion (Index) | 100 | 120 | 118 | 132 | 127 | 135 | 128 |

Mooney viscosity (ML1+4(125° C.)) values were measured in accordance with ASTM standard D1646.

Hardness values were measured in accordance with DIN 53505.

300% modulus values were measured in accordance with ISO 37 and ASTM D412 standards.

G', G" and tanδ as viscoelasticity values were measured at 0.5% strain in a temperature range of −60° C. to 60° C. under 10 Hz frequency by using an ARES measuring device.

Abrasion resistance performance values were measured by using a LAT-100 abrasion measuring device.

In Table 2, Mooney viscosity is a value showing viscosity of unvulcanized rubber, and the lower a numerical value of Mooney viscosity is, the more excellent processability of the unvulcanized rubber is. Hardness is a value showing handling stability, and the higher a hardness value is, the more excellent the handling stability is. −30° C. G' is a value showing braking properties on an ice and snow road surface, and the lower a numerical value of −30° C. G' is, the more excellent a braking performance value is. 0° C. G" is a value showing braking properties on a dry or wet road surface, and the higher a numerical value of 0° C. G" is, the more excellent a braking performance value is. Further, 60° C. tanδ is a value showing rotational resistance properties, and the lower a numerical value of 60° C. tanδ is, the more excellent a rotational resistance performance value is.

When replacing portions of amounts of hydrocarbon-based resins used in Examples 1 to 6 with a hydrogenated styrene-butadiene rubber as an additive, thereby applying the hydrogenated styrene-butadiene rubber, 60° C. tanδ performance showing rolling resistance properties is improved, and an effect of improving the abrasion resistance performance as much as 20 to 35% is confirmed even in evaluation results of a LAT-100 abrasion tester for measuring abrasion resistance performance.

Hereinabove, preferred embodiments of the present disclosure have been described in detail. However, the scope of the right of the present disclosure is not limited thereto. The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

As a tire according to the present disclosure comprises a hydrocarbon-based resin and a hydrogenated styrene-butadiene rubber to improve compatibility of a raw rubber, particularly a raw rubber having a very low glass transition temperature, the present disclosure can provide a rubber composition for tire tread, which can be applied to four-season and summer tires by maximizing abrasion resistance performance without deteriorating performance on a dry or wet road surface, and a tire manufactured by using the rubber composition for the tire tread.

What is claimed is:

1. A rubber composition for tire tread, the rubber composition comprising:
   100 parts by weight of a raw rubber;
   50 to 200 parts by weight of a reinforcing filler;
   5 to 100 parts by weight of a hydrocarbon-based resin; and
   5 to 50 parts by weight of a hydrogenated styrene-butadiene rubber,
   wherein the raw rubber is a solution polymerized styrene-butadiene rubber which is denaturalized into a rubber chain by using silicate;
   wherein the hydrogenated styrene-butadiene rubber is a hydrogenated styrene-butadiene rubber in which the number of double bonds present within a main chain of the styrene-butadiene rubber, through hydrogenation with respect to a styrene-butadiene rubber, is not more than 2% of the total number of bonds within the main chain, of which a weight average molecular weight (Mw) is in a range greater than 200,000 g/mol and less than or equal to 400,000 g/mol, and which has not more than 1 wt % of a vinyl content therewithin.

2. The rubber composition for the tire tread of claim 1, wherein the solution polymerized styrene-butadiene rubber is a solution polymerized styrene-butadiene rubber having 10 to 30 wt % of a styrene content, 10 to 40 wt % of a vinyl content within butadiene, 500,000 to 900,000 g/mol of a weight average molecular weight ($M_w$), and −70 to −55° C. of a glass transition temperature.

3. The rubber composition for the tire tread of claim 1, wherein the reinforcing filler is carbon black, silica, or a mixture thereof.

4. The rubber composition for the tire tread of claim 1, wherein the hydrocarbon-based resin is a hydrocarbon-based resin having 2,000 g/mol or less of a weight average molecular weight ($M_w$) and 80° C. or more of a glass transition temperature.

5. The rubber composition for the tire tread of claim 1, wherein the hydrogenated styrene-butadiene rubber is a hydrogenated styrene-butadiene rubber which is manufactured through hydrogenation with respect to a styrene-butadiene rubber having 30 to 35 wt % of a styrene content and 25 to 40 wt % of a vinyl content.

6. The rubber composition for the tire tread of claim 1, wherein the hydrogenated styrene-butadiene rubber is a hydrogenated styrene-butadiene rubber having −40 to −20° C. of a glass transition temperature.

7. A tire manufactured by using the rubber composition for the tire tread according to claim 1.

* * * * *